(12) United States Patent
Stoyanchev et al.

(10) Patent No.: US 11,288,457 B1
(45) Date of Patent: Mar. 29, 2022

(54) DIALOG MANAGEMENT USING KNOWLEDGE GRAPH-DRIVEN INFORMATION STATE IN A NATURAL LANGUAGE PROCESSING SYSTEM

(71) Applicant: Interactions LLC, Franklin, MA (US)

(72) Inventors: Svetlana Stoyanchev, Jersey City, NJ (US); Michael Johnston, New York, NY (US)

(73) Assignee: Interactions LLC, Franklin, MA (US)

( * ) Notice: Subject to any disclaimer, the term of this patent is extended or adjusted under 35 U.S.C. 154(b) by 156 days.

(21) Appl. No.: 16/265,668

(22) Filed: Feb. 1, 2019

Related U.S. Application Data

(60) Provisional application No. 62/625,106, filed on Feb. 1, 2018.

(51) Int. Cl.
*G06F 40/30* (2020.01)
*G06F 40/205* (2020.01)
*G06F 40/295* (2020.01)

(52) U.S. Cl.
CPC ............ *G06F 40/30* (2020.01); *G06F 40/205* (2020.01); *G06F 40/295* (2020.01)

(58) Field of Classification Search
CPC .......... G06N 5/022; G06N 20/00; G06N 5/02; G06F 40/295; G06F 16/3329; G10L 15/1822
See application file for complete search history.

(56) References Cited

U.S. PATENT DOCUMENTS

| 2010/0106607 | A1* | 4/2010 | Riddiford | .......... G06Q 30/0603 705/15 |
| 2015/0142704 | A1* | 5/2015 | London | .................. G06N 5/022 706/11 |
| 2017/0068903 | A1* | 3/2017 | Hakkani-Tur | ......... G06N 20/00 |
| 2017/0154108 | A1* | 6/2017 | Kraus | ..................... G06F 16/243 |
| 2018/0075359 | A1* | 3/2018 | Brennan | ............. G06F 16/9024 |
| 2018/0255005 | A1* | 9/2018 | Agarwal | ............. G06F 16/9535 |

(Continued)

OTHER PUBLICATIONS

Allen, J. et al., "An Architecture for a Generic Dialogue Shell," Natural Language Engineering, 2000, vol. 1 6, pp. 213-228.

(Continued)

*Primary Examiner* — Mark Villena
(74) *Attorney, Agent, or Firm* — Fenwick & West LLP

(57) ABSTRACT

Systems and methods are disclosed for determining a move driven by an interaction. In some embodiments, a processor determines an operational state of an interaction with a user based on parameter values of a data structure. The processor identifies a plurality of candidate moves for changing the operational state by determining a domain in which the interaction is occurring, retrieving a set of candidate moves that correspond to the domain from a knowledge graph, and adding the set to the plurality of candidate moves. The processor encodes input of the user received during the interaction into encoded terms, and determines a move for changing the operational state based on a match of the encoded terms to the set of candidate moves. The processor updates the parameter values of the data structure based on the move to reflect a current operational state led to by the move.

20 Claims, 5 Drawing Sheets

(56) References Cited

U.S. PATENT DOCUMENTS

2018/0276273 A1*  9/2018  Mittal .................. G06F 40/30
2020/0159997 A1*  5/2020  Wu ..................... G06F 40/20

OTHER PUBLICATIONS

Bohus, D. et al., "Ravenclaw: Dialog management using hierarchical task decomposition and an expectation agenda," Eurospeech, 2003, pp. 597-600.

Bordes, W. et al., "Learning end-to-end goal oriented dialog," ICLR, 2017 15 pages.

Bos, J. et al., DIPPER: Description and Formalisation of an Information-State Update Dialogue System Architecture, Proceedings of the Fourth SIGdial Workshop of Discourse and Dialogue, 2003, pp. 115-124.

Ginzburg, J., "Dynamics and the semantics of dialogue," Seligman, Jerry, & Westerst ahl, Dag (eds), Logic, language and computation, 1996, pp. 1-16.

Lison, P. et al., "OpenDial: A toolkit for developing spoken language dialogue systems with probabilistic rules," Proceedings of the 54th Annual Meeting of the Association for Computational Linguistics—System Demonstrations, Aug. 7-12, 2016, pp. 67-72.

Mittal, S. et al., "Thinking, Fast and Slow: Combining Vector Spaces and Knowledge Graphs." arXiv preprint, 2017, arXiv 1708.03310.

Sonntag, D. et al., "Supporting a rapid dialogue system engineering process," Proceedings of the $1^{st}$ IWSDS, 2009, 12 pages.

Stoyanchev, S. et al., "Knowledge-Graph Driven Information State Approach to Dialog," Workshops at the Thirty second AAAI Conference on Artificial Intelligence, Jun. 20, 2018, pp. 735-738.

Stoyanchev, S. et al., "Rapid prototyping of form-driven dialogue systems using an open-source framework," Proceedings of the SIGDIAL 2016 Conference, Sep. 13-15, 2016, pp. 216-219.

Traum, D.R. et al., "The Information State Approach to Dialogue Management," Current and New Directions in Discourse, 2003, pp. 325-353.

Wessel, M. et al., "An Ontology-Based Dialogue Management System for Virtual Personal Assistants," Proceedings of the 8th International Workshop On Spoken Dialogue Systems (IWSDS), 2017, 12 pages.

Williams, J.D. et al., "Hybrid Code Networks: practical and efficient end-to-end dialog control with supervised and reinforcement learning," Proceedings of the $55^{th}$ Annual Meeting of the Association for Computational Linguistics, Jul. 30-Aug. 4, 2017, pp. 665-677.

Xu, W. et al., "Task-based dialog management using an agenda," Proceedings of the 2000 ANLP/NAACL Workshop on Conversational Systems, 2000, vol. 3, pp. 42-47.

\* cited by examiner

US 11,288,457 B1

DIALOG MANAGEMENT USING KNOWLEDGE GRAPH-DRIVEN INFORMATION STATE IN A NATURAL LANGUAGE PROCESSING SYSTEM

CROSS REFERENCE TO RELATED APPLICATIONS

This application claims the benefit of U.S. Provisional Application No. 62/625,106, filed Feb. 1, 2018, the disclosure of which is hereby incorporated by reference herein in its entirety.

TECHNICAL FIELD

The disclosure generally relates to the field of interactive natural language processing systems, and more particularly, to an interactive natural language processing system that handles user conversation dialogs using a knowledge graph.

BACKGROUND

In some related art systems, dialog patterns are explicitly laid out by a dialog designer as a series of pre-determined dialog states or nodes with fixed transitions among them. These related art systems are rigid, and thus disadvantageous, because input from users in an interaction that does not fit an authored dialog state or transition, or input that specifies multiple transitions, may not be understood by the related art systems.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes a knowledge graph-based interaction system, where domain-specific information is authored by a dialog designer (interchangeably used with the term "administrator"), but where interaction states (and moves or transitions between those states) need not be authored. As user input is received during an interaction (e.g., a verbal dialog with an automated service), both domain-specific information and non-domain-specific information from the knowledge graph is used to determine updates to an operational (or interaction) state (e.g., items that form part of an order). This approach improves upon the rigidity of related art systems, in that the use of the knowledge graph enables the system to determine state based on complex input without a need to match the input to expressly-authored transitions.

In some embodiments, a processor (e.g., of an automated interaction service) determines an operational state of an interaction with a user based on parameter values of a data structure. The processor identifies a plurality of candidate moves for changing the operational state. The identifying may include determining a domain in which the interaction is occurring, retrieving a set of candidate moves that correspond to the domain from a knowledge graph, and adding the set to the plurality of candidate moves. The processor encodes input of the user received during the interaction into encoded terms, and determines a move for changing the operational state based on a match of the encoded terms to the set of candidate moves. The processor then updates the parameter values of the data structure based on the move to reflect a current operational state led to by the move.

Automated Interaction Service System Architecture

Figure 1:
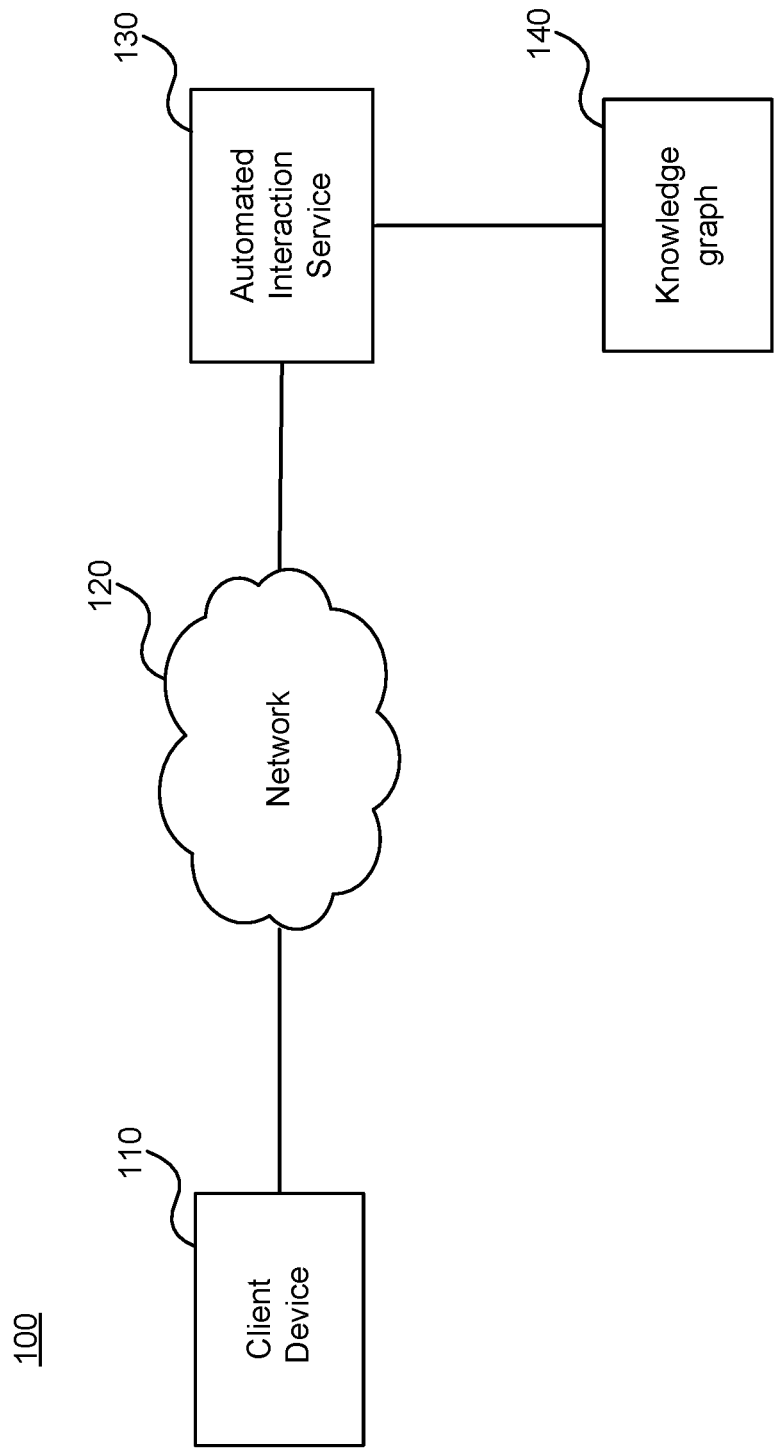
FIG. 1 illustrates one embodiment of a system including an automated interaction service driven using a knowledge graph, in accordance with some embodiments of the disclosure.

Figure (FIG. 1 illustrates one embodiment of a system including an automated interaction service driven using a knowledge graph, in accordance with some embodiments of the disclosure. System 100 includes client device 110. The architecture of client device 110 is discussed further below with respect to FIG. 2. Client device 110 may be a device where input is received from a user in connection with an interaction. For example, client device 110 may be a telephonic device, which receives input from a user and transmits that input over network 120 to automated interaction service 130 for processing. As an example, the input may be "I would like . . . to order a pepperoni pizza," which may be transmitted to automated interaction service 130, which processes an order for a pepperoni pizza in the manners described below. The details of network 120 are discussed in further detail below with respect to FIG. 2. Further details of automated interaction service 130 are discussed in further detail below with respect to FIGS. 2-5.

The term "input" as used herein may refer both to verbal input (e.g., speech or textual input), and to non-verbal input, such as multimodal inputs that combine voice or text with other modes. As an example, non-verbal inputs may be used when the client device has a visual output, such as a smartphone's screen which may output an image or a video. As another example, emojis, gestures, and the like may be used by the user to select an item or option (e.g., from a visual presentation on client device 110). Emojis, gestures, and objects in images or videos may have their characteristics mapped to a knowledge graph, as described herein, and may have their characteristics extracted for comparison to the knowledge graph, consistent with the text-based examples described herein.

Automated interaction service 130 is a service that processes input received from client device 110. For example, if client device 110 is attempting to order a pizza from a pizzeria, automated interaction service 130 receives input relating to the order (e.g., "I would like a pepperoni pizza;" or "I would like peppers and onions on the pizza;" or "Please give me a diet coke"). Automated interaction service 130 processes the input to understand the order contents and update an interaction state (interchangeably used herein with the term "order state" or "operational state"). As used herein, the term "interaction state" refers to an understanding of automated interaction service 130 of what the user wishes to order. For example, when the user of client device 110 begins an order and states "I would like a pepperoni pizza," automated interaction service 130 updates an interaction state to (ORDER STATE: [1 PIZZA—TOPPINGS: PEPPERONI]). When the user goes on to state "I would like peppers and onions on the pizza," automated interaction service 130 updates an interaction state to (ORDER STATE: [1 PIZZA—TOPPINGS: PEPPERONI, PEPPERS, ONIONS]). When the user goes on to state "Please give me a diet coke," automated interaction service 130 updates an interaction state to (ORDER STATE: [1 PIZZA—TOPPINGS: PEPPERONI, PEPPERS, ONIONS], [1 DRINK—DIET COKE]). Manners of updating the interaction state are described in further detail below.

Knowledge graph 140 includes a mapping between possible user input, and moves (e.g., changes in an order state) in the order state that correspond to the possible user input. For example, knowledge graph 140 includes a mapping between the input "I would like" and a decision to add something to an order, which may result in a move of an order state. Further details of knowledge graph 140 will be described with respect to FIGS. 3 and 4 below. Automated interaction service 130 references knowledge graph 140 to resolve the intent of input received from a user. While only one knowledge graph 140 is depicted, multiple knowledge graphs 140 may be referenced by automated interaction service 130. For example, each of the multiple knowledge graphs 140 may correspond to a given domain (e.g., each may correspond to a different restaurant from which a user may be ordering). Similarly, while only one automated interaction service 130 is depicted, there may be several automated interaction services 130 in system 100 (e.g., each corresponding to a different domain). In such embodiments, each of the several automated interaction services 130 may be standalone servers, or may be instantiations distributed in one or several servers, optionally each dedicated to their own respective domains. As used herein, the term "domain" may refer to a source, or set, of data that relates to the interaction being performed by the user. For example, if the user is ordering from a restaurant, the domain may be the restaurant menu. If the user is interacting with an airline to purchase tickets, the domain may be available tickets.

Figure 3:
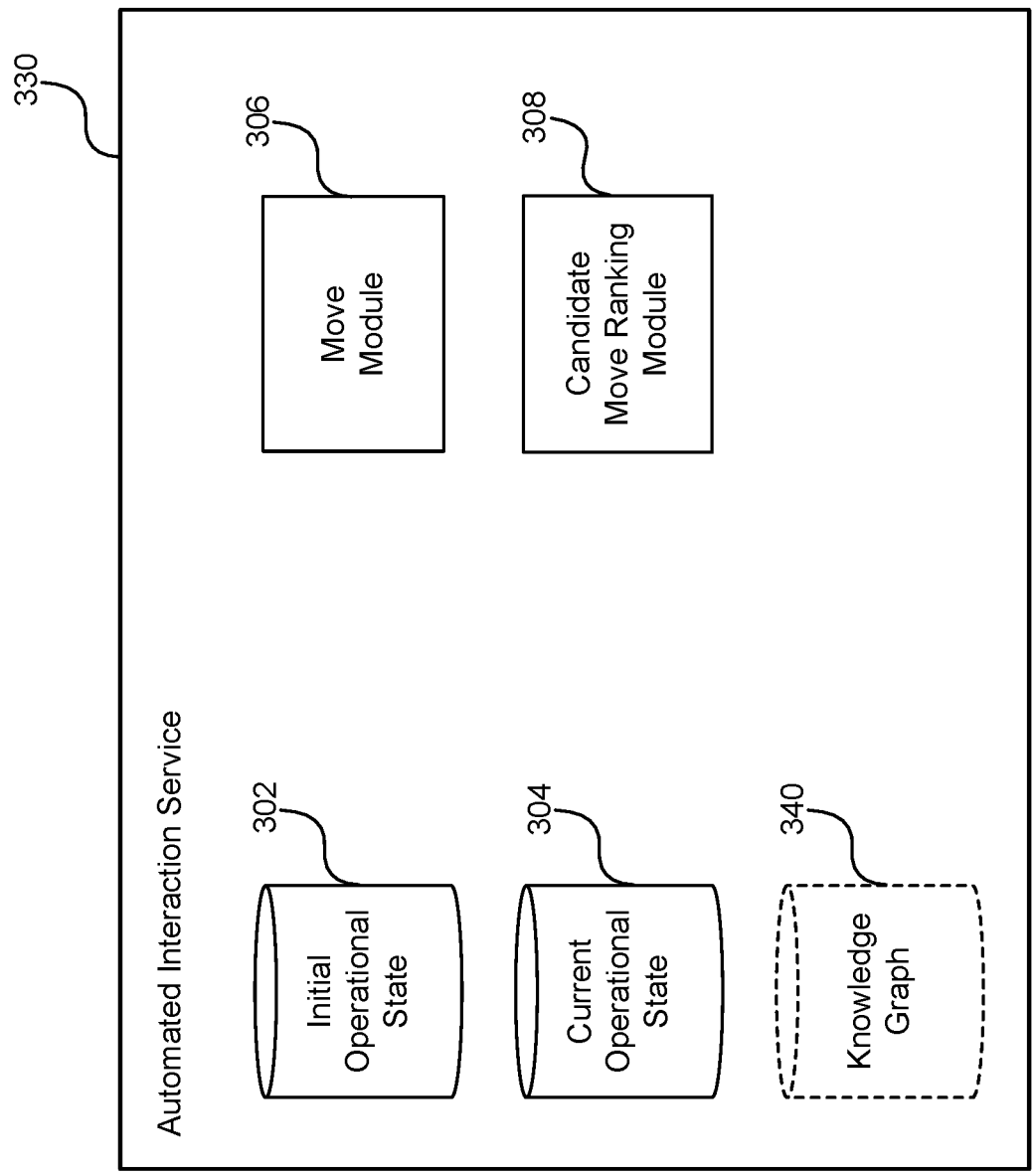
FIG. 3 illustrates one embodiment of modules and databases used by an automated interaction service, in accordance with some embodiments of the disclosure.

While knowledge graph 140 is depicted as separate from automated interaction service 130, knowledge graph 140 may, in some embodiments, be a module of automated interaction service 130 (to be described in further detail with respect to FIG. 3. While depicted in FIG. 1 as part of a same sub-network as automated interaction service 130, knowledge graph 140 may instead be accessible to automated interaction service 130 by way of network 120 (e.g., in a scenario where knowledge graph 140 is provided by a third party service). Automated interaction service 130 and/or knowledge graph 140 may be implemented as a module within client device 110 (e.g., as part of a mobile phone application).

Computing Machine Architecture

Figure 2:
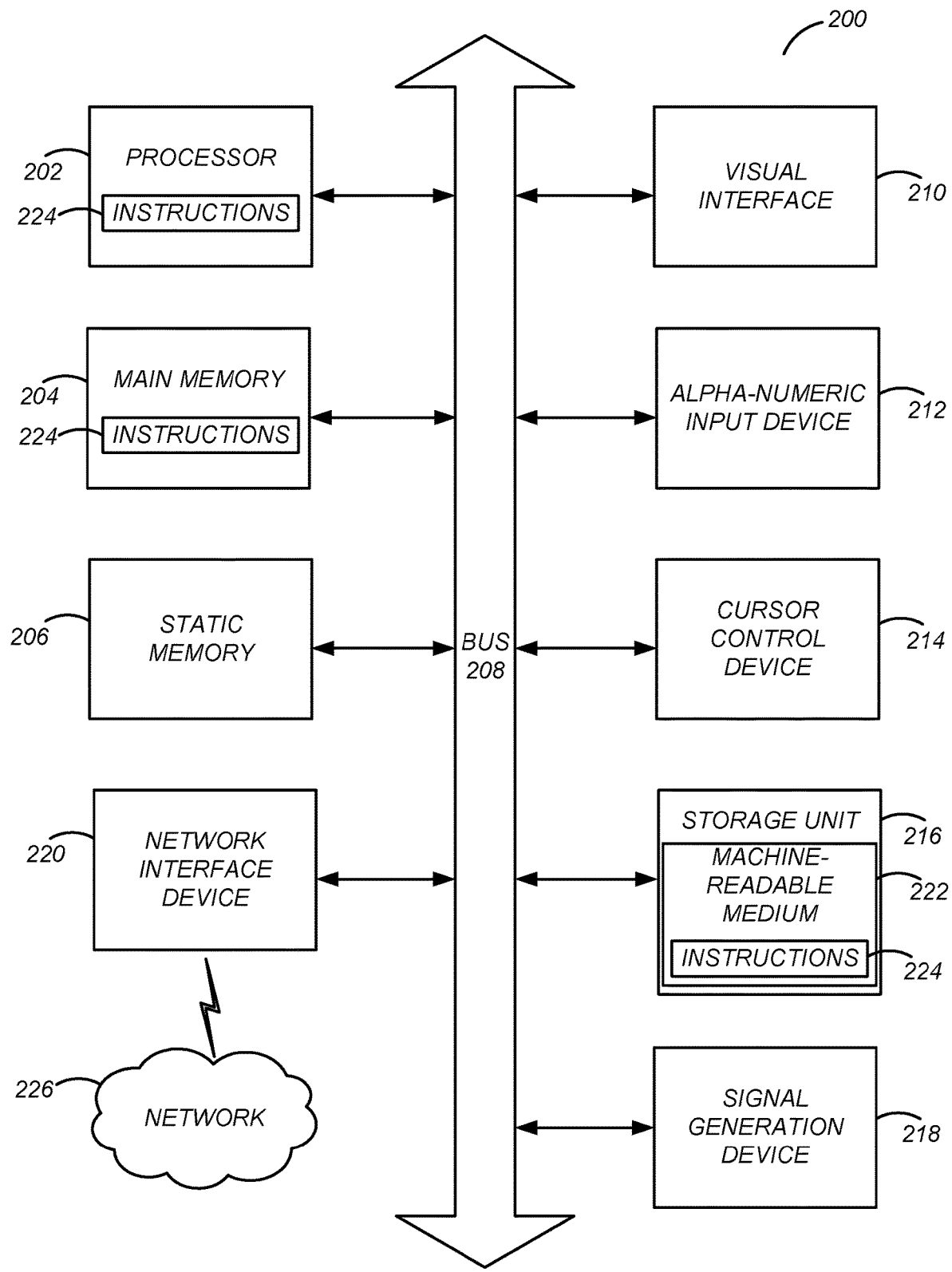
FIG. 2 illustrates one embodiment of a block diagram illustrating components of an example machine able to read instructions from a machine-readable medium and execute them in a processor (or controller), in accordance with some embodiments of the disclosure.

FIG. (FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which program code (e.g., software) for causing the machine to perform any one or more of the methodologies discussed herein may be executed. The program code may be comprised of instructions 224 executable by one or more processors 202. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include visual display interface 210. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 210 may include or may interface with a touch enabled screen. The computer system 200 may also include alphanumeric input device 212 (e.g., a keyboard or touch screen keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Automated Interaction Service Functionality

FIG. 3 illustrates one embodiment of modules and databases used by an automated interaction service, in accordance with some embodiments of the disclosure. FIG. 3 depicts automated interaction service 330, which carries the same weight of description of automated interaction service 130 made above with respect to FIG. 1. Automated interaction service 330 includes a database 302 indicating an initial operational state.

A processor of automated interaction service 330 (e.g., processor 202) retrieves the initial operational state for an interaction from database 302 when the interaction is initiated. For example, in a scenario where a user of client device 110 initiates an interaction with automated interaction service 330 to order pizza from a pizzeria, processor 202 of automated interaction service 330 may retrieve an initial operational state showing that no order has taken place yet. One representation of this would be a data structure with various parameters, such as a pizza parameter, a pepperoni parameter, a drink parameter, and the like, where each of the parameter values is set to zero, indicating that the initial order state is that no item has been ordered.

Initially, the initial operational state forms data structure 302, which reflects the current operational state of the interaction. Processor 202 thus registers the initial operational state retrieved from database 302 to data structure 304. As user input is received in connection with the interaction, processor 202 of automated interaction service 330 executes move module 306 to analyze the interaction. Move module 306 may include one or more submodules, such as a natural language understanding module, input processing module (e.g., gesture or image input), utterance processing module, and the like, which may be called upon to translate language to a desired move or interaction. Processor 202 then determines whether the interaction demands a move, and if so, determines what move is to be made. As used herein, the term "move" refers to changing the current operational state to an updated current operational state based on intent determined from user input during an interaction.

In order to determine a move, move module 306 identifies candidate moves. As used herein, the term "candidate moves" refers to a set of possible changes that can be made to the current operational state. For example, candidate moves may include the addition or removal of an item from a current order (e.g., add pizza), a modification of an item in a given order (e.g., modify pizza order to include pepperoni), and the like. Candidate moves may change during the course of an interaction, based on the current state of the interaction. For example, when the initial ordering state is null, in that nothing has been ordered, the candidate moves may only include adding items to the order. When the initial ordering state is not null (e.g., a pizza has been added to the order), move module 306 may determine that additional candidate moves are available (e.g., an option to remove the pizza from the order, or modify the pizza).

In some embodiments, move module 306 identifies candidate moves by determining a domain in which the interaction is occurring. For example, move module 306 may determine that a user is calling to order from a particular restaurant or store, and thus the domain corresponds to that particular restaurant or store. Move module 306 may make this determination based on metadata of the interaction (e.g., a phone number, virtual number, destination address, or the like used by client device 110 to reach automated interaction service 330) that move module 306 knows to correspond to a particular domain (e.g., by referencing a mapping table that maps the metadata to respective domains). Move module 306 may alternatively or additionally make this determination based on determining that the user refers to the particular domain during the interaction (e.g., by detecting a mention of the name of the domain). In some embodiments, automated interaction service 330 is a dedicated service corresponding to a particular domain, and thus move module 306 already has determined the domain by default.

Move module 306 may retrieve a set of candidate moves that correspond to the domain from knowledge graph 340. Knowledge graph 340 is depicted as part of automated interaction service 330, but as described above, knowledge graph 340 may be located at one or more different servers separate and apart from automated interaction service 330. In some embodiments, knowledge graph 340 includes candidate moves corresponding to different domains (e.g., moves corresponding to a pizza menu, moves corresponding to a hamburger menu, etc.). In such embodiments, move module 306 retrieves the subset of candidate moves of knowledge graph 340 that correspond to the determined domain that correspond to the current operation state. In other embodiments, knowledge graph 340 is dedicated to the domain in question, and thus the subset of candidate moves of knowledge graph 340 that correspond to the current operation state need not be filtered to ensure only those moves that correspond to the determined domain are retrieved.

Move module 306 then adds the set to the plurality of candidate moves. In embodiments where the interaction has just begun and the current operational state includes null parameters only, the plurality of candidate moves may only include the set of candidate moves just retrieved from knowledge graph 340. In embodiments where the interaction has not just begun, the retrieved set of candidate moves may supplement other moves (e.g., the retrieved set of candidate moves may include those moves that were previously inapplicable, such as the removal of a pizza if a pizza had just been added to an order state). The retrieved set of candidate moves may remove moves that are no longer applicable (e.g., an option to start a new order).

Each of the plurality of candidate moves has a semantic portion, and an action portion. The semantic portion represents semantics of a user utterance that may match the candidate move. The action portion encodes the action to be performed on the information state if the candidate move is selected.

Move module 306 then encodes the input of the user received during the interaction into encoded terms (e.g., into a vector representation). For example, a candidate move for a user utterance of "add onions to the large pepperoni pizza" may be represented as a structure by setting matching key values: {intent=add_topping, add_val=onions, ref_size=large, ref_topping=pepperoni}. The structure may be encoded into a vector of real numbers. A non-verbal input may be represented as a move that does not require disambiguation in the way that an utterance requires, and thus does not require any move scoring. Textual input, on the other hand, would be represented in the same manner as received spoken utterances.

Following the above embodiments for encoding the input, as part of the encoding process, move module 306 categorizes each of the terms with an entity label. For example, again based on the natural language processing algorithm, move module 306 (e.g., by executing an input processing submodule) determines that the intent of an utterance "I would like X" corresponds to a command to add whatever follows the term "I would like" to the order. In some embodiments, to determine the type of term (e.g., decision term), move module 306 categorizes each of the terms with an entity label by applying a transformation to the input based on a heuristic rules or a statistical model, and then determines each entity label for the terms based on the transformation, the entity label categorizing the type of term. For example, "add mushrooms to the pepperoni one" may lead to labels consistent with the following: ATTRIBUTES "mushroom", pepperoni, and ITEM: "the pepperoni one". In some embodiments, an utterance may be categorized as an addition or subtraction command from one or more of the parameter values. For example, if the current operational state indicates that two pizzas have been ordered, and the utterance intent is to remove one, then move module 306 will categorize the removal as a subtraction command when processing a move to generate new operational state 304. Labels and values will be described in further detail below with reference to FIG. 4.

Processor 202 determines a move for changing the operational state based on a match of the encoded terms to the set of candidate moves. In connection with determining one or more moves that match the intent of the user, processor 202 may execute candidate move ranking module 308. Candidate move ranking module 308 may be a submodule of move module 306, called on by move module 306 for execution, or may be a stand-alone module. Candidate move ranking module 308 ranks the candidate moves in order of likelihood that the candidate move matches the intent of the user. To this end, candidate move ranking module 308 may determine, for each respective candidate move of the plurality of candidate moves, a respective probability that the respective move matches a given term of the terms. For example, a heuristic, a dot product, or a statistical model trained on data may be used to compute the probability of a match. For example, move module 306 may encode user input of "add mushrooms to the pepperoni one" into a semantic vector of real numbers. Each value in the semantic vector corresponds to an element from the domain (INTENT:add_item, TOPPING:pepperoni, TOPPING:mushrooms, etc.). All the values that match the input utterance or labels of move module 306 will be set to a value between 0 and 1 corresponding based on their string match (0 for no match, 1 for exact match). Other, or all, candidate moves are also encoded by move module 306 in a vector with the same dimensions (with 1 for the values that are expected to appear in an utterance that matches this move). Move ranking module 308 computes the dot-product between the encoded utterance and the encoded move or applies a statistical model to determine the match between the two vectors resulting in a higher score for the moves with the most match, and uses that match to inform the semantic encoding of an utterance.

Candidate move ranking module 308 then assigns, for each respective candidate move of the plurality of candidate moves, a respective score based on the respective probability. Candidate move ranking module 308 outputs these respective scores to move module 306. Move module 306 receives the respective scores, and selects the move to be a candidate move of the plurality of candidate moves with a highest respective score. In some embodiments, where the move comprises a plurality of decisions, move module 306 may determine that each decision corresponds to a change of a separate parameter value of the plurality of parameter values.

In some embodiments, move ranking module 308 need not be executed by move module 306 to determine a matching move. For example, the moves for updating initial operational state 302 may be derived directly from the annotations assigned by an input processing sub-module of move module 306. In this embodiment of the system candidate move ranking module 308 is not used.

Exemplary Domain-Specific Knowledge Graph Architecture

Figure 4:
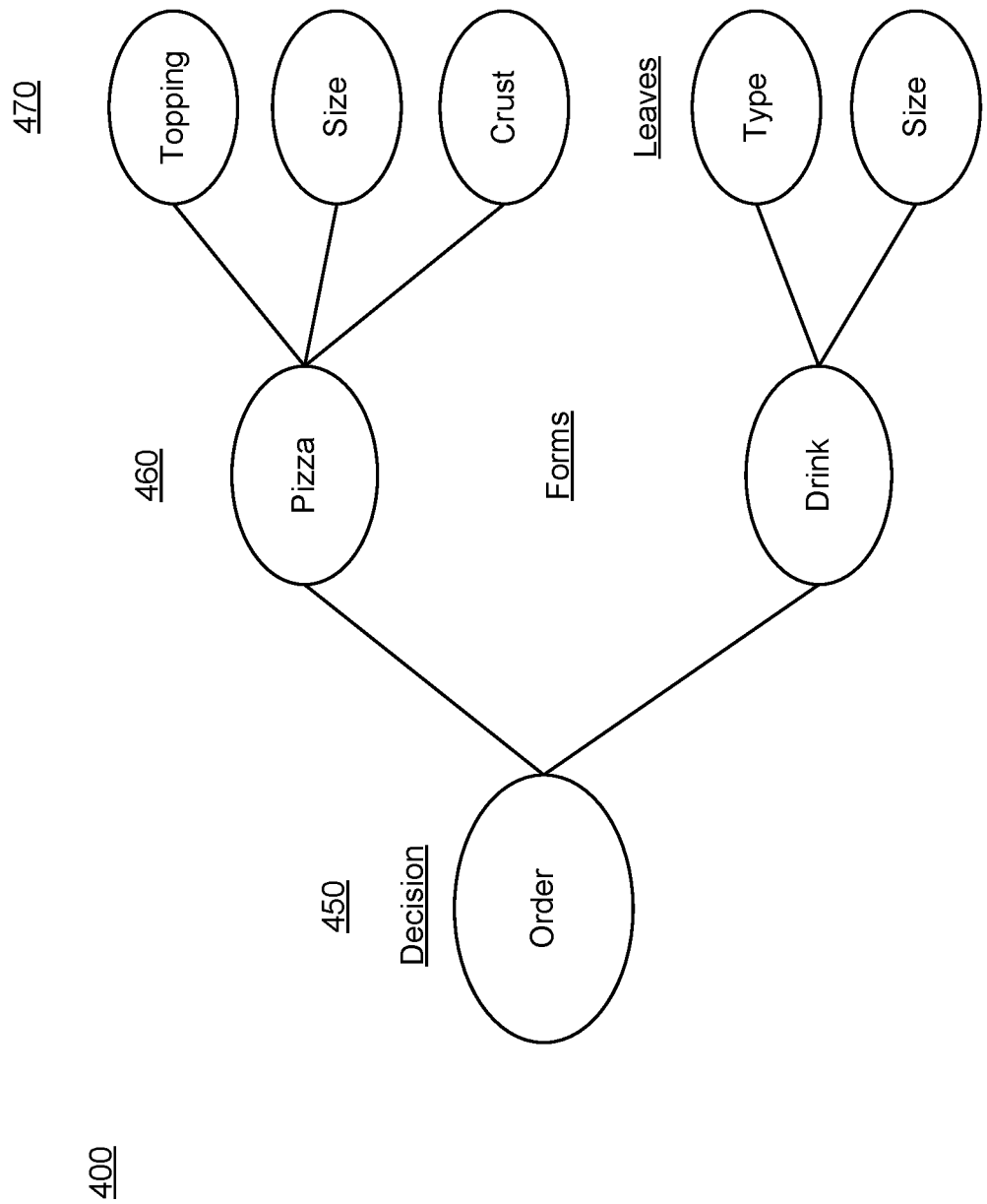
FIG. 4 depicts one embodiment of an exemplary architecture of a segment of a knowledge graph corresponding to a domain, in accordance with some embodiments of the disclosure.

FIG. 4 depicts one embodiment of an exemplary architecture of a segment of a knowledge graph corresponding to a domain, in accordance with some embodiments of the disclosure. Architecture 400 includes decision nodes 450, form nodes 460, and leaf nodes 470. As used herein, the term decision node refers to an action that can be taken by the user that alters the current operational state of the interaction, as reflected in data structure 304. While the decision "order" is depicted in FIG. 4, this is merely for purposes of example; other decisions may form part of the knowledge graph, such as "remove," "modify," and the like.

Form nodes 460 are higher level items on which a decision may act. For example, when a user orders a pizza, the user is making a decision to order a higher level item with lower level attributes, such as toppings, size, crust, etc. As another example, when a user orders a drink, the drink may be any number of types or sizes, and thus the drink is a higher level item with lower level attributes. Leaf nodes 470 are children of form nodes and represent attributes of the form node to which they are connected. Further children may emanate from leaf nodes 470 (e.g., pepperoni, mushroom, onion from the "topping" leaf node).

The candidate moves for a domain include the various permutations of decisions, forms, and leaves (and further children if applicable). For example, candidate moves may include ordering (e.g., decision) a pizza (e.g., form) of any size (e.g., leaf), with any type of crust (e.g., leaf), and with no topping, some toppings, or all available toppings (e.g., leaf).

Move Determination Process

Figure 5:
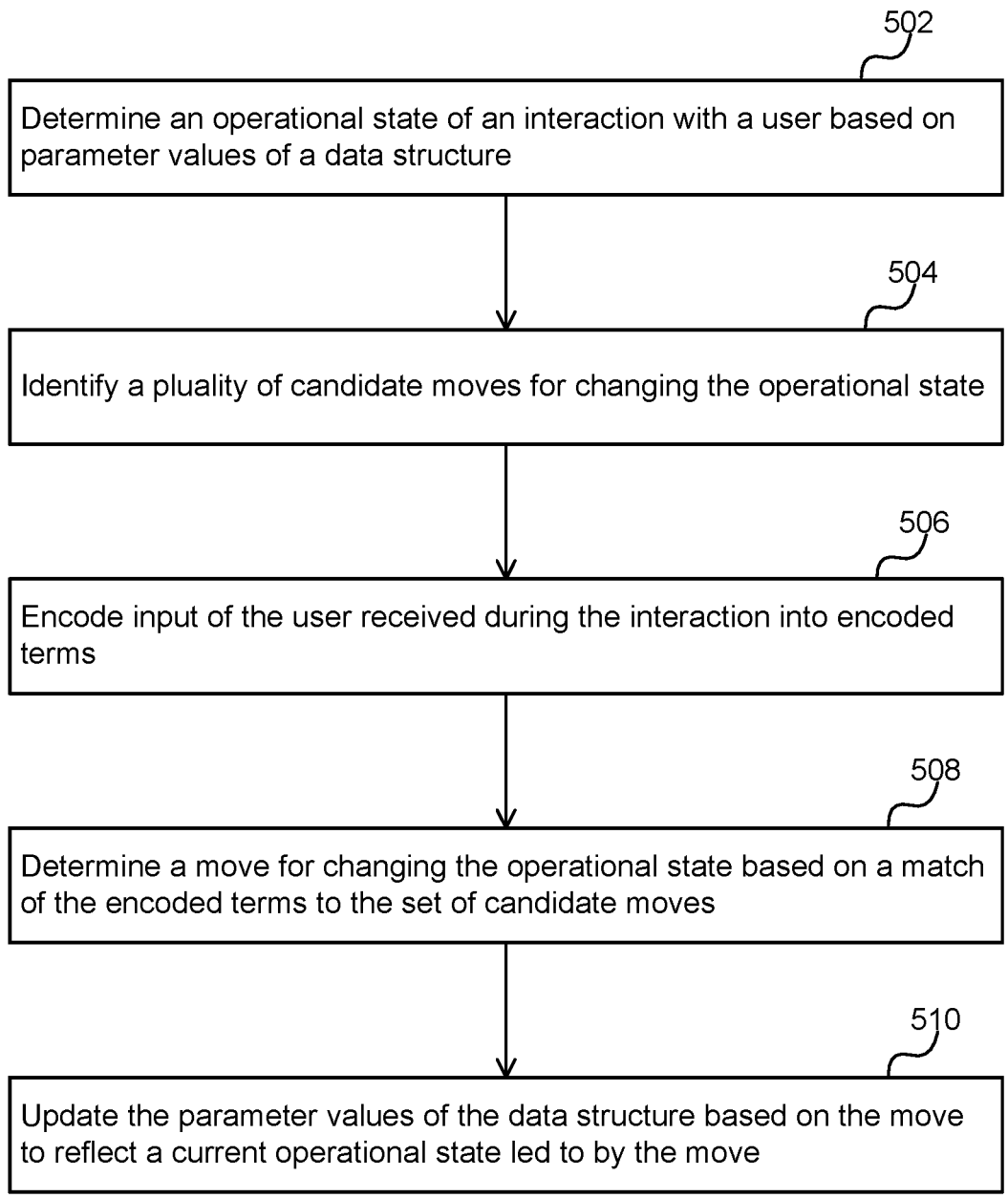
FIG. 5 depicts one embodiment of an exemplary flowchart of a process for determining a move for changing an operational state based on data of a knowledge graph, in accordance with some embodiments of the disclosure.

FIG. 5 depicts one embodiment of an exemplary flowchart of a process for determining a move for changing an operational state based on data of a knowledge graph, in accordance with some embodiments of the disclosure. Process 500 begins with processor 202 of automated interaction service 130 determining 502 an operational state of an interaction with a user based on parameter values of a data structure. For example, as discussed above, processor 202 retrieves the current operational state from data structure 304 (e.g., by executing move module 306).

Processor 202 identifies 504 a plurality of candidate moves for changing the operational state. For example, as discussed above, move module 306 retrieves candidate moves for the interaction from knowledge graph 340. Processor 202 then encodes 506 input of the user received during the interaction into encoded terms (e.g., a vector of intents, labels, etc., as discussed above). Processor 202 then determines 508 a move for changing the operational state based on a match of the encoded terms to the set of candidate moves (e.g., based on output from candidate move ranking module 308, as discussed above). Processor 202 then updates 510 the parameter values of the data structure based on the move to reflect a current operational state led to by the move. In some embodiments, processor 202 outputs a verbal response to the user based on the updated operational state (e.g., "I have added a pepperoni pizza to your order").

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules.

A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a knowledge graph-driven interactions system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   determining an operational state of an interaction with a user based on parameter values of a data structure, the operational state reflecting a current status of a request associated with an earlier-made selection made by the user during the interaction, as updated based on the interaction;
   identifying a plurality of candidate moves for changing the operational state, the identifying comprising:
      determining a domain in which the interaction is occurring;
      retrieving a set of candidate moves that correspond to the domain from a knowledge graph, wherein the earlier-made selection corresponds to a first move of the knowledge graph, the first move including a node at a first level of the knowledge graph, and wherein the set of candidate moves includes a plurality of nodes at a second level of the knowledge graph; and
      adding the set to the plurality of candidate moves;
   encoding input of the user received during the interaction into encoded terms;
   determining a second move for changing the operational state based on a match of the encoded terms to the set of candidate moves; and
   updating the parameter values of the data structure based on the second move to reflect a current operational state led to by the second move, wherein the set of candidate moves is updated to remove a prior-available candidate move based on the updated parameter values, and wherein the prior-available candidate move has become unavailable based on a de-selection of an earlier-made selection made by the user during the interaction.

2. The computer-implemented method of claim 1, wherein identifying the plurality of candidate moves comprises:
   identifying a non-null parameter value of the parameter values;
   determining potential moves for modifying the non-null parameter value; and adding the potential moves to the plurality of candidate moves.

3. The computer-implemented method of claim 1, wherein encoding the input of the user received during the interaction into the encoded terms comprises:
parsing the input into terms;
categorizing each of the terms with an entity label;
determining an intent of the terms based on each entity label; and
generating the encoded terms based on the intent.

4. The computer-implemented method of claim 3, wherein categorizing each of the terms with an entity label comprises:
applying a transformation to the input based on a heuristic; and
determining each entity label for the terms based on the transformation.

5. The computer-implemented method of claim 3, wherein encoded terms that are categorized as a decision correspond to an addition or subtraction from one or more of the parameter values, wherein encoded terms that are categorized as a form indicate a set of parameters corresponding to the parameter values to be changed as part of the state change, and wherein encoded terms that are categorized as a leaf indicate a parameter value corresponding to the set of parameters that is to be changed.

6. The computer-implemented method of claim 3, wherein determining the second move for changing the operational state comprises:
determining, for each respective candidate move of the plurality of candidate moves, a respective probability that the respective move matches a given term of the terms;
assigning, for each respective candidate move of the plurality of candidate moves, a respective score based on the respective probability; and
selecting the second move to be a candidate move of the plurality of candidate moves with a highest respective score.

7. The computer-implemented method of claim 6, wherein the second move comprises a plurality of decisions, each corresponding to a change of a separate parameter value of the plurality of parameter values.

8. The computer-implemented method of claim 1, further comprising:
outputting a verbal message as part of the interaction based on the current operational state.

9. A non-transitory computer-readable storage medium storing computer program instructions executable by a processor to perform operations comprising:
determining an operational state of an interaction with a user based on parameter values of a data structure, the operational state reflecting a current status of a request associated with an earlier-made selection made by the user during the interaction, as updated based on the interaction;
identifying a plurality of candidate moves for changing the operational state, the identifying comprising:
determining a domain in which the interaction is occurring;
retrieving a set of candidate moves that correspond to the domain from a knowledge graph, wherein the earlier-made selection corresponds to a first move of the knowledge graph, the first move including a node at a first level of the knowledge graph, and wherein the set of candidate moves includes a plurality of nodes at a second level of the knowledge graph; and
adding the set to the plurality of candidate moves;
encoding input of the user received during the interaction into encoded terms;
determining a second move for changing the operational state based on a match of the encoded terms to the set of candidate moves; and
updating the parameter values of the data structure based on the second move to reflect a current operational state led to by the second move, wherein the set of candidate moves is updated to remove a prior-available candidate move based on the updated parameter values, and wherein the prior-available candidate move has become unavailable based on a de-selection of an earlier-made selection made by the user during the interaction.

10. The non-transitory computer-readable storage medium of claim 9, wherein generating the plurality of candidate moves comprises:
identifying a non-null parameter value of the parameter values;
determining potential moves for modifying the non-null parameter value; and
adding the potential moves to the plurality of candidate moves.

11. The non-transitory computer-readable storage medium of claim 9, wherein encoding the input of the user received during the interaction into the encoded terms comprises:
parsing the input into terms;
categorizing each of the terms with an entity label;
determining an intent of the terms based on each entity label; and
generating the encoded terms based on the intent.

12. The non-transitory computer-readable storage medium of claim 11, wherein categorizing each of the terms with an entity label comprises:
applying a transformation to the input based on a heuristic; and
determining each entity label for the terms based on the transformation.

13. The non-transitory computer-readable storage medium of claim 11, wherein encoded terms that are categorized as a decision command an addition or subtraction from one or more of the parameter values, wherein encoded terms that are categorized as a form indicate a set of parameters corresponding to the parameter values to be changed as part of the state change, and wherein encoded terms that are categorized as a leaf indicate a parameter value corresponding to the set of parameters that is to be changed.

14. The non-transitory computer-readable storage medium of claim 11, wherein determining the second move for changing the operational state comprises:
determining, for each respective candidate move of the plurality of candidate moves, a respective probability that the respective move matches a given term of the terms;
assigning, for each respective candidate move of the plurality of candidate moves, a respective score based on the respective probability; and
selecting the second move to be a candidate move of the plurality of candidate moves with a highest respective score.

15. The non-transitory computer-readable storage medium of claim 14, wherein the second move comprises a plurality of decisions, each corresponding to a change of a separate parameter value of the plurality of parameter values.

16. A system comprising:
a processor for executing computer program instructions; and
a non-transitory computer-readable storage medium storing computer program instructions executable by the processor to perform operations comprising:
  determining an operational state of an interaction with a user based on parameter values of a data structure, the operational state reflecting a current status of a request associated with an earlier-made selection made by the user during the interaction, as updated based on the interaction;
  identifying a plurality of candidate moves for changing the operational state, the identifying comprising:
    determining a domain in which the interaction is occurring;
    retrieving a set of candidate moves that correspond to the domain from a knowledge graph, wherein the earlier-made selection corresponds to a first move of the knowledge graph, the first move including a node at a first level of the knowledge graph, and wherein the set of candidate moves includes a plurality of nodes at a second level of the knowledge graph; and
    adding the set to the plurality of candidate moves;
  encoding input of the user received during the interaction into encoded terms;
  determining a second move for changing the operational state based on a match of the encoded terms to the set of candidate moves; and
  updating the parameter values of the data structure based on the second move to reflect a current operational state led to by the second move, wherein the set of candidate moves is updated to remove a prior-available candidate move based on the updated parameter values, and wherein the prior-available candidate move has become unavailable based on a de-selection of an earlier-made selection made by the user during the interaction.

17. The system of claim 16, wherein generating the plurality of candidate moves comprises:
  identifying a non-null parameter value of the parameter values;
  determining potential moves for modifying the non-null parameter value; and
  adding the potential moves to the plurality of candidate moves.

18. The system of claim 16, wherein encoding the input of the user received during the interaction into the encoded terms comprises:
  parsing the input into terms;
  categorizing each of the terms with an entity label;
  determining an intent of the terms based on each entity label; and
  generating the encoded terms based on the intent.

19. The system of claim 18, wherein categorizing each of the terms with an entity label comprises:
  applying a transformation to the input based on a heuristic; and
  determining each entity label for the terms based on the transformation.

20. The system of claim 18, wherein encoded terms that are categorized as a decision command an addition or subtraction from one or more of the parameter values, wherein encoded terms that are categorized as a form indicate a set of parameters corresponding to the parameter values to be changed as part of the state change, and wherein encoded terms that are categorized as a leaf indicate a parameter value corresponding to the set of parameters that is to be changed.

* * * * *